(12) United States Patent
Kim

(10) Patent No.: US 6,914,384 B2
(45) Date of Patent: Jul. 5, 2005

(54) DEGAUSSING CIRCUIT FOR CRT MONITOR

(75) Inventor: Tai-hung Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 10/673,128

(22) Filed: Sep. 30, 2003

(65) Prior Publication Data

US 2004/0066141 A1 Apr. 8, 2004

(30) Foreign Application Priority Data

Oct. 4, 2002 (KR) ................................ 10-2002-0060544

(51) Int. Cl.[7] .............................................. H01J 29/06
(52) U.S. Cl. ............................ 315/8; 315/85; 361/150
(58) Field of Search ............................ 315/8, 85, 370; 361/150

(56) References Cited

U.S. PATENT DOCUMENTS 4,908,550 A * 3/1990 Chase et al. .................. 315/8
5,742,127 A    4/1998 Ahn ............................... 315/8

FOREIGN PATENT DOCUMENTS

| JP | 58-99084    | 6/1983  |
| JP | 59-182692   | 10/1984 |
| JP | 64-29077    | 1/1989  |
| JP | 3-101579    | 4/1991  |
| JP | 5-260495    | 10/1993 |
| JP | 6-189323    | 7/1994  |
| KR | 1999-71086  | 9/1999  |

* cited by examiner

*Primary Examiner*—David Vu
(74) *Attorney, Agent, or Firm*—Staas & Halsey LLP

(57) ABSTRACT

A degaussing circuit for compulsorily degaussing a picture tube of a CRT monitor by causing alternating current to flow through a degaussing coil. A switching part, connected to a first end of the degaussing coil, switches a current flowing into the degaussing coil on/off. A chargeable device connected to the first end or to a second end of the degaussing coil removes a potential difference across the degaussing coil when the switching part is turned off. Alternatively, chargeable devices may be connected to both the first and second ends of the degaussing coil. Thus, an electromagnetic field is prevented from being generated by the residual current in the degaussing coil, to thereby meet electromagnetic field safety standards for the monitor.

7 Claims, 2 Drawing Sheets

DEGAUSSING CIRCUIT FOR CRT MONITOR

CROSS-REFERENCE TO RELATED APPLICATIONS

This application claims the benefit of Korean Application No. 2002-60544, filed Oct. 4, 2002, in the Korean Intellectual Property Office, the disclosure of which is incorporated herein by reference.

BACKGROUND OF THE INVENTION

1. Field of the Invention

The present invention relates to a degaussing circuit for a CRT monitor, and more particularly, to a degaussing circuit for a CRT monitor stably performing a degaussing operation.

2. Description of the Related Art

A degaussing circuit restores magnetic properties of a cathode ray tube (CRT) so that images appear as clear images having original colors. Images may become blurred or changed to other colors by exposure to an earth magnetic field or other exterior circumstances.

FIG. 2 is a view illustrating a degaussing circuit of a conventional CRT monitor. As shown in FIG. 2, one end of a degaussing coil 111 is connected to a terminal of a power supply circuit part 20 through a Positive Temperature Coefficient (PTC) thermistor 115 and the other end of the degaussing coil 111 is connected to another terminal of the power supply circuit part 120 through contacts (1, 2) of a relay 118. One end of an actuator coil of the relay 118 is connected to a voltage source V10 through a resistor R1 and another end of the actuator coil is connected to a collector terminal of a pnp transistor 117. The actuator coil of the relay 118 is turned on when the pnp transistor 117 is turned on, thus closing the contacts (1, 2) of the relay 118. A diode D1 is connected in parallel with the actuator coil to dissipate energy stored in the actuator coil when the relay is turned off.

The pnp transistor 117 is turned on/off by a low/high degaussing control signal generated from a micom (not shown) when a power supply switch (not shown) of the CRT monitor is turned on or when a user wants to perform a degaussing operation. The low/high degaussing control signal is supplied to a base terminal of the transistor 117 through an input terminal 116 and a resistor R2. An emitter terminal of the transistor 117 is connected to a ground potential.

On degaussing, if a low signal is output from the micom to the pnp transistor 117, the pnp transistor 117 is turned on, to thereby operate the relay 118. When the relay 118 is operated, power is supplied to the degaussing coil 111 and current flows through the degaussing coil 111. When current flows in the PTC thermistor 115, an internal resistance of the PTC thermistor 115 is increased by a self heating and thus the current flowing through the degaussing coil 111 is cut off, to stop the degaussing operation.

However, according to the conventional degaussing circuit, even after the degaussing operation is stopped, a potential difference occurs by a residual current in the degaussing coil 111 and a magnetic field which exceeds safety standards for electric and magnetic field emissions is thereby created.

SUMMARY OF THE INVENTION

Accordingly, it is an aspect of the present invention to provide a degaussing circuit which meets safety standards for an electromagnetic field of a monitor by preventing the electromagnetic field from being generated by a residual current in a degaussing coil.

Additional aspects and advantages of the invention will be set forth in part in the description which follows, and, in part, will be obvious from the description, or may be learned by practice of the invention.

The present invention achieves a degaussing circuit for a CRT monitor, which compulsorily degausses a picture tube by allowing alternating current to flow through a degaussing coil and comprises a switching part connected to one end of a degaussing coil and which switches a current flowing into the degaussing coil on/off; and a chargeable device connected to an end of the degaussing coil and which removes a potential difference applied between the both ends of the degaussing coil when the switching part is turned off. Alternatively another chargeable device may connected to the other end of the degaussing coil.

BRIEF DESCRIPTION OF THE DRAWINGS

The above and/or other aspects and advantages of the present invention will become apparent and more readily appreciated from the following description, taken in conjunction with the accompany drawings of which.

DESCRIPTION OF THE PREFERRED EMBODIMENT

Figure 1:
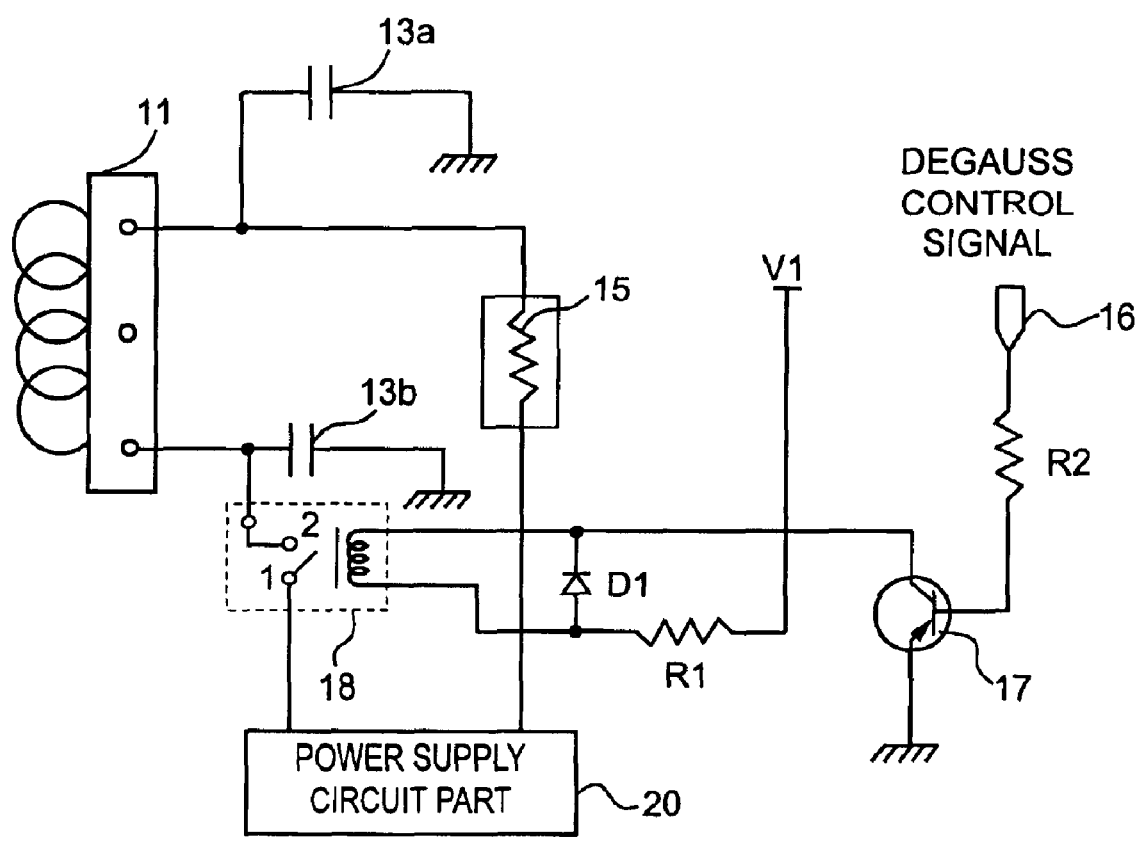
FIG. 1 is a view illustrating a degaussing circuit for a CRT monitor according to the present invention.
Figure 2:
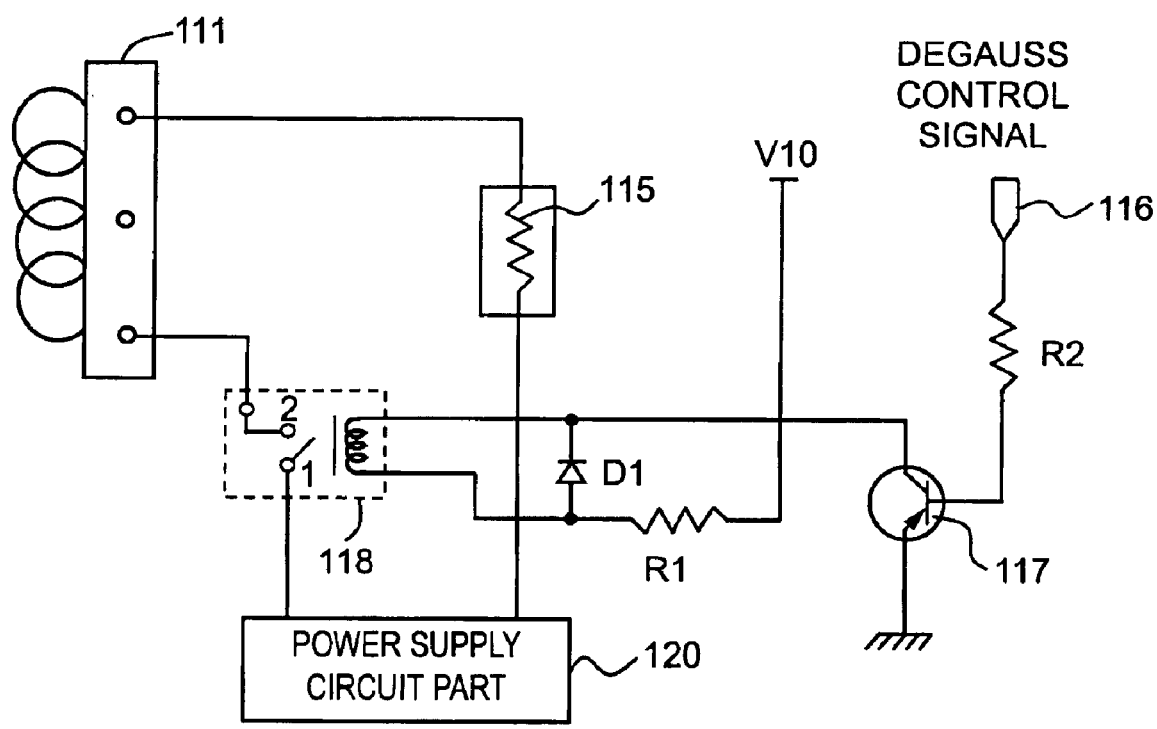
FIG. 2 is a view illustrating a conventional degaussing circuit for a CRT monitor.

The present invention will be described below with reference to FIG. 1. FIG. 1 is a view illustrating a degaussing circuit according to the present invention. As shown in FIG. 1, one end of a degaussing coil 11 is connected to one terminal of a power supply circuit part 20 through a PTC thermistor 15 and another end of the degaussing coil 11 is connected to a relay 18 for turning on/off connection between another terminal of the power supply circuit part 20 and the degaussing coil 11. One end of an actuator coil of the relay 18 is connected to a voltage V1 through a resistor R1 and another end of the actuator coil is connected to a collector terminal of a pnp transistor 17. The actuator coil is turned on when the pnp transistor 17 is turned on.

According to the present invention, capacitors 13a and 13b are connected to respective opposite ends of the degaussing coil 11 and are charged due to current flowing through the degaussing coil 11. Accordingly, an electromagnetic field around the degaussing coil 11 is prevented from being generated by removing a potential difference applied between both ends of the degaussing coil 11 by a residual current in the degaussing coil 11 when a degaussing operation stops.

The pnp transistor 17 is turned on/off by a low/high degaussing control signal generated from a micom (not shown) according to selection of a degaussing switch (not shown) when a power supply switch (not shown) of a CRT monitor is turned on or when a user wants to perform a degaussing operation. The low/high degaussing control signal is supplied to a base terminal of the transistor 17 through an input terminal 16 and a resistor R2. An emitter terminal of the transistor 17 is connected to a ground potential.

On degaussing, if a low signal is output from the micom to the pnp transistor 17, the pnp transistor 17 is turned on, to thereby turn on the relay 18. When the relay 18 is turned on, power is supplied to the degaussing coil 11 and thus current flows through the degaussing coil 11. Accordingly, as the current flows through the degaussing coil 11, the current flows through the PTC thermistor 15 connected to the end of the degaussing coil 11. An internal resistance of the PTC thermistor 15 is increased by self heating due to the current flow, cutting off the current flowing in the degaussing coil 11 to stop the degaussing operation.

With the circuit as shown in FIG. 1, after the degaussing operation is stopped, the electromagnetic field is prevented from being generated by the residual current in the degaussing coil 11, to thereby meet safety standards for electromagnetic fields.

As described above, according to the present invention, the electromagnetic field is prevented from being generated by the residual current in the degaussing coil, to thereby meet safety standards for electromagnetic fields of a monitor.

Although an embodiment of the present invention have been shown and described, it will be appreciated by those skilled in the art that changes may be made in these embodiments without departing from the principles and spirit of the invention, the scope of which is defined in the appended claims and their equivalents.

What is claimed is:

1. A degaussing circuit for compulsorily degaussing a picture tube of a CRT monitor by controlling a flow of alternating current through a degaussing coil having first and second input terminals, comprising:

a switching part which switches a current flowing into the first input terminal of the degaussing coil on/off; and a chargeable device connected to one of the first and second input terminals of the degaussing coil and which removes a potential difference applied between the first and second terminals of the degaussing coil when the switching part is turned off.

2. The degaussing circuit according to claim 1, wherein the chargeable device comprises a capacitor.

3. The degaussing circuit according to claim 1, further comprising another chargeable device connected to another of the first and second input terminals.

4. The degaussing circuit according to claim 1, wherein the another chargeable device is a capacitor.

5. A degaussing circuit for degaussing a picture tube, comprising:

a power supply circuit which supplies an alternating current;

a degaussing coil having first and second input terminals;

a switch which selectively applies the alternating current to the degaussing coil via the first and second input terminals;

a thermistor, serially connected with the switch and the coil and which progressively diminishes the current flowing in the coil due to self heating of the thermistor;

a transistor which controls operation of the switch according to a control signal; and a capacitor, connected between one of the first and second coil input terminals and a potential and which conducts a residual current in the coil at a time of turning off the switch to the potential.

6. The degaussing circuit of claim 5, further comprising:

a second capacitor connected between another of the first and second coil input terminals and the potential.

7. A method of eliminating a residual magnetic field in a degaussing coil of a picture tube, the degaussing coil having first and second input terminals and receiving a time diminishing AC current to perform a degaussing operation, the method comprising:

coupling at least one of the first and second coil input terminals to a potential through a chargeable device so current flowing in the coil at a time of turning off the current is passed to the potential.

* * * * *